US006270147B1

(12) United States Patent
Butler et al.

(10) Patent No.: US 6,270,147 B1
(45) Date of Patent: Aug. 7, 2001

(54) DRIVE ARRANGEMENT FOR A POWER LIFTGATE INCLUDING CLUTCHING MECHANISM

(75) Inventors: Frederick C Butler, Davisburg, MI (US); Peter L Oxley, Mt Albert (CA)

(73) Assignees: DaimlerChrysler Corporation, Auburn Hills, MI (US); Atoma International Corporation, Newmarket (CA)

(*) Notice: Subject to any disclaimer, the term of this patent is extended or adjusted under 35 U.S.C. 154(b) by 0 days.

(21) Appl. No.: 09/479,159

(22) Filed: Jan. 7, 2000

(51) Int. Cl.[7] ........................................ B60J 5/10

(52) U.S. Cl. .................................... 296/146.4; 296/146.8; 49/140; 74/625; 74/89.18

(58) Field of Search ............................ 296/146.4, 146.8, 296/56; 49/139, 140; 74/625, 89.18; 192/20

(56) References Cited

U.S. PATENT DOCUMENTS

| | | | | |
|---|---|---|---|---|
| 2,621,543 | * | 12/1952 | Rossmann . | |
| 2,833,536 | | 5/1958 | Joachim et al. . | |
| 5,448,856 | | 9/1995 | Moore et al. | 49/340 |
| 5,531,498 | | 7/1996 | Kowall | 296/146.4 |
| 5,563,483 | | 10/1996 | Kowall et al. | 318/283 |
| 5,794,381 | | 8/1998 | Rizkovsky . | |
| 6,021,691 | * | 2/2000 | Wilkerson, Jr. | 74/547 |
| 6,055,776 | * | 5/2000 | Dettling et al. | 49/341 |
| 6,135,536 | * | 10/2000 | Ciavaglia et al. | 296/146.6 |

FOREIGN PATENT DOCUMENTS

| | | | | |
|---|---|---|---|---|
| 197 58 130 | | 9/1998 | (DE) . | |
| 2169652 | * | 7/1986 | (GB) | 49/139 |

* cited by examiner

*Primary Examiner*—D. Glenn Dayoan
*Assistant Examiner*—Patricia Engle
(74) *Attorney, Agent, or Firm*—Mark P. Calcaterra

(57) ABSTRACT

A drive arrangement for articulating a liftgate of a motor vehicle between an open position and a closed position. The liftgate is mounted to a body of the motor vehicle for articulation about a pivot axis. The drive arrangement includes a mounting member for attachment to the body of the motor vehicle. A drive motor is attached to the mounting member. A crank arm is pivotally interconnected to the mounting member. The crank arm includes a driven gear. A linkage includes a first end attached to the crank arm and a second end attached to the liftgate. A drive gear is driven by the drive motor. A clutching mechanism is operative for selectively coupling and decoupling the driven gear to the drive gear.

17 Claims, 6 Drawing Sheets

DRIVE ARRANGEMENT FOR A POWER LIFTGATE INCLUDING CLUTCHING MECHANISM

BACKGROUND OF THE INVENTION

1. Technical Field

The present invention generally relates to motor vehicles. More particular, the present invention relates to a drive arrangement for articulating a closure panel of a motor vehicle under a source of power. More specifically, but without restriction to the particular embodiment and/or use which is shown and described for purposes of illustration, the present invention relates to a motor vehicle having a drive arrangement for articulating a liftgate between a closed position and an open position under a source of power which has a clutching mechanism.

2. Discussion

In sport utility vehicles, station wagons, minivans and other similar vehicles having a substantially vertical rear access opening, there is often provided a sideways-type swinging tailgate that swings about a generally vertical axis. Minimal effort is required to open and close such a tailgate. It is also typical in such vehicles to provide a liftgate which upwardly swings about a horizontal axis to open or a tailgate which swings downwardly about a horizontal axis to open. Downwardly swinging tailgates are also common on pick-up trucks for providing access to the bed area. Where the tailgate or liftgate pivots about a horizontal axis significant manual effort is required for opening and closing.

For the convenience of the people using a vehicle having a tailgate or liftgate which pivots about a horizontal axis, it is desired to provide a power lift system to relieve a person of the required effort for opening and closing. However, there is limited space in the vehicle body for a power lift system to handle the lift effort required. Various arrangements for articulating a vehicle closure panel about a horizontal axis under a source of power have been heretofore proposed. For example, commonly assigned U.S. Pat. No. 5,531,498 is directed to such an arrangement and is hereby incorporated by reference as if fully set forth herein. Other known arrangements are shown in commonly assigned U.S. Pat. Nos. 5,563,483; and 5,448,856, which are also incorporated by reference as if fully set forth herein.

While known arrangements for articulating a closure panel of a motor vehicle about a horizontally extending pivot axis have relieved persons using the vehicle of the effort otherwise required to articulate the closure panel, they are all associated with disadvantages. For example, known arrangements include constantly meshed gear sets which significantly add to the effort necessary to articulate the closure panel when manual operation is desired or required.

SUMMARY OF THE INVENTION

It is a general object of the present invention to provide an improved drive arrangement for articulating a motor vehicle liftgate between an open position and a closed position under a source of power.

It is another object of the present invention to provide a drive arrangement for articulating a closure panel between an open position and a closed position which does not adversely effect the effort required to manually articulate the closure panel.

It is a more particular object of the present invention to provide a drive arrangement for articulating a closure panel between an open position and a closed position including a clutching mechanism.

In one form, the present invention provides a drive arrangement for articulating a liftgate of a motor vehicle between an open position and a closed position. The liftgate is mounted to a body of the motor vehicle for articulation about a pivot axis. The drive arrangement includes a mounting member for attachment to the body of the motor vehicle. A drive motor is attached to the mounting member. A drive gear is driven by the motor. A crank arm is pivotally interconnected to the mounting member. The crank arm includes a driven gear. A linkage includes a first end attached to the crank arm and a second end for attachment to the liftgate. A clutching mechanism is operative for selectively coupling and decoupling the driven gear to the drive gear.

In another form, the present invention provides a motor vehicle including a body, a liftgate and a drive arrangement. The body defines a rear opening. The liftgate is mounted to the body for articulation about a horizontally extending pivot axis between an open position and a closed position for selectively providing access to the rear opening. The drive arrangement is operative for articulating the liftgate between the open position and the closed position under a source of power. The drive arrangement includes a mounting member for attachment to the body of the motor vehicle. The drive arrangement additionally includes a drive motor attached to the mounting member. A drive gear is driven by the motor. A crank arm is pivotally interconnected to the mounting member. The crank arm includes a sector gear. A linkage includes a first end attached to the crank arm and a second end for attachment to the liftgate. A gear set is driven by the electric motor. A clutching mechanism is operative for selectively coupling and decoupling the drive gear to the sector gear.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
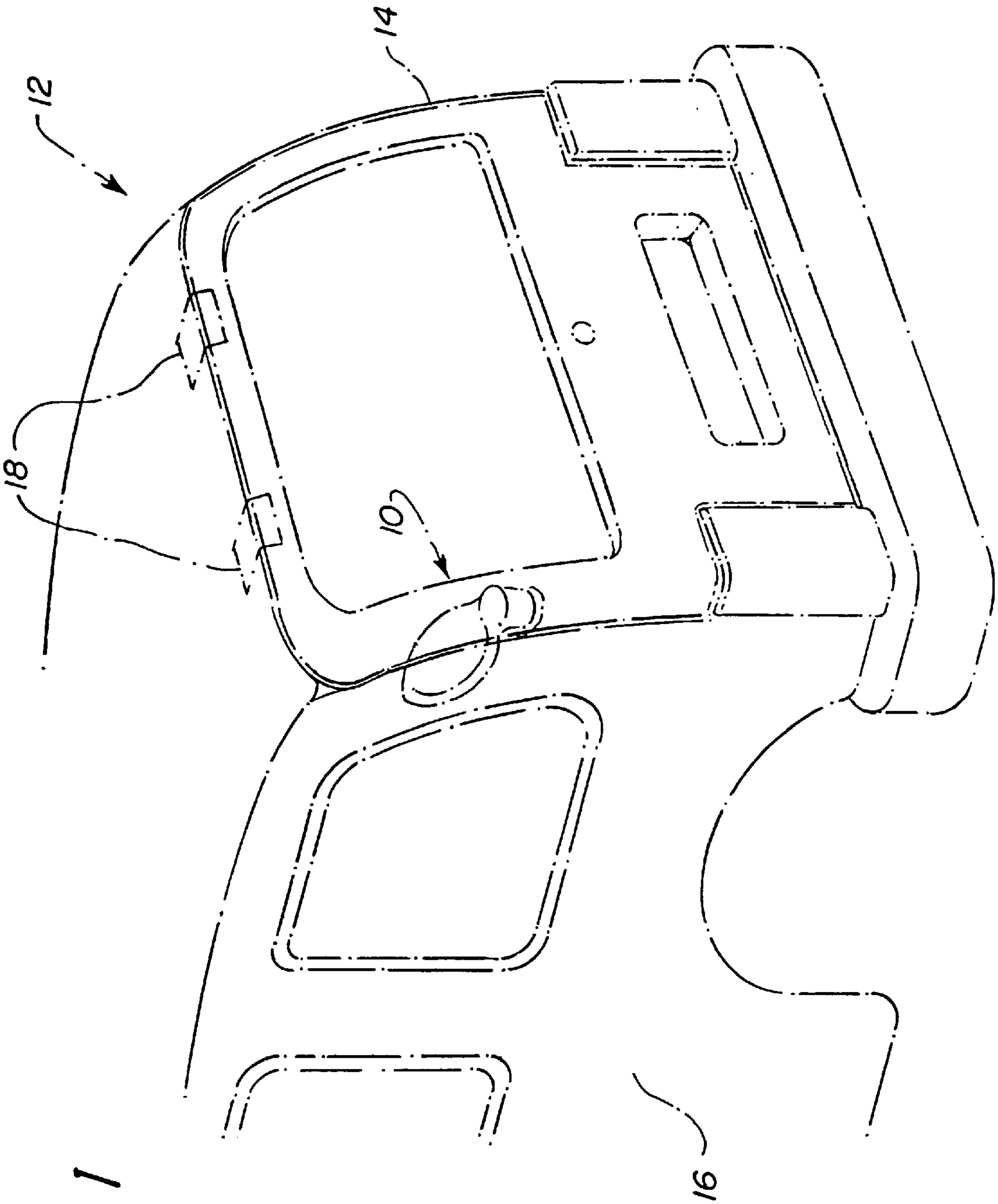
FIG. 1 is a perspective view of a portion of a motor vehicle including a drive arrangement constructed in accordance with the teachings of a preferred embodiment of the present invention.

With initial reference to FIG. 1 of the drawings, a drive arrangement for a motor vehicle closure panel constructed in accordance with the teachings of the preferred embodiment of the present invention is generally identified at reference numeral 10. The drive arrangement 10 is shown operatively incorporated into an exemplary motor vehicle 12. The motor vehicle 12 is shown to include a closure panel 14 conventionally attached to a body 16 of the vehicle 12 through a pair of hinges 18. As will be discussed in detail below, the drive arrangement 10 of the present invention is operative to articulate the closure panel 14 between a closed position and an open position under a source of power.

In the exemplary embodiment, the motor vehicle shown throughout the drawings is illustrated as a minivan 12. The closure panel is shown as a liftgate 14 which is articulable about an upper horizontal edge thereof. It will be understood that the teachings of the present invention have applicability to other types of vehicles, including but not limited to sport utility vehicles, pickup trucks, station wagons and other vehicles having closure panels, such as tailgates or liftgates, which pivot about a horizontal axis.

With continued reference to the environmental view of FIG. 1 and additional reference to FIGS. 2–5, the drive arrangement 10 of the present invention will be described in further detail. The drive arrangement 10 is illustrated to include a mounting member or casting 20. The mounting member 20 is secured to a D-pillar 22 of the vehicle body 16 with a plurality of fasteners 24. A mounting bracket 23 (shown in FIGS. 4 and 5) further secures the mounting member 20 to the D-pillar 22. The mounting bracket 23 is bolted, rivetted or welded to the mounting member 20 and similarly attached to the D-pillar 22. While not illustrated, it will be understood that interior trim portions are normally attached to the body 16 which serve to substantially conceal the mounting member 20 and the remainder of the drive arrangement 10. In the preferred embodiment, the mounting member 20 is preferably shown to be unitarily constructed of aluminum or other suitable material through a casting process.

The drive arrangement 10 of the present invention further generally includes a crank arm 26. As shown most clearly in the side view of FIG. 2, the crank arm 26 is configured generally in the shape of a quarter circle and is preferably constructed of metal. The crank arm 26 is mounted for rotation relative to the mounting member 20 through a pivot shaft 28. The pivot shaft 28 passes through an aperture 30 provided in a recessed portion 32 of the mounting member 20 and is attached to the mounting member 20 through suitable bushings 34. The pivot shaft 28 defines a pivot axis for the crank arm 26 which extends transverse to the motor vehicle 12.

Figure 2:
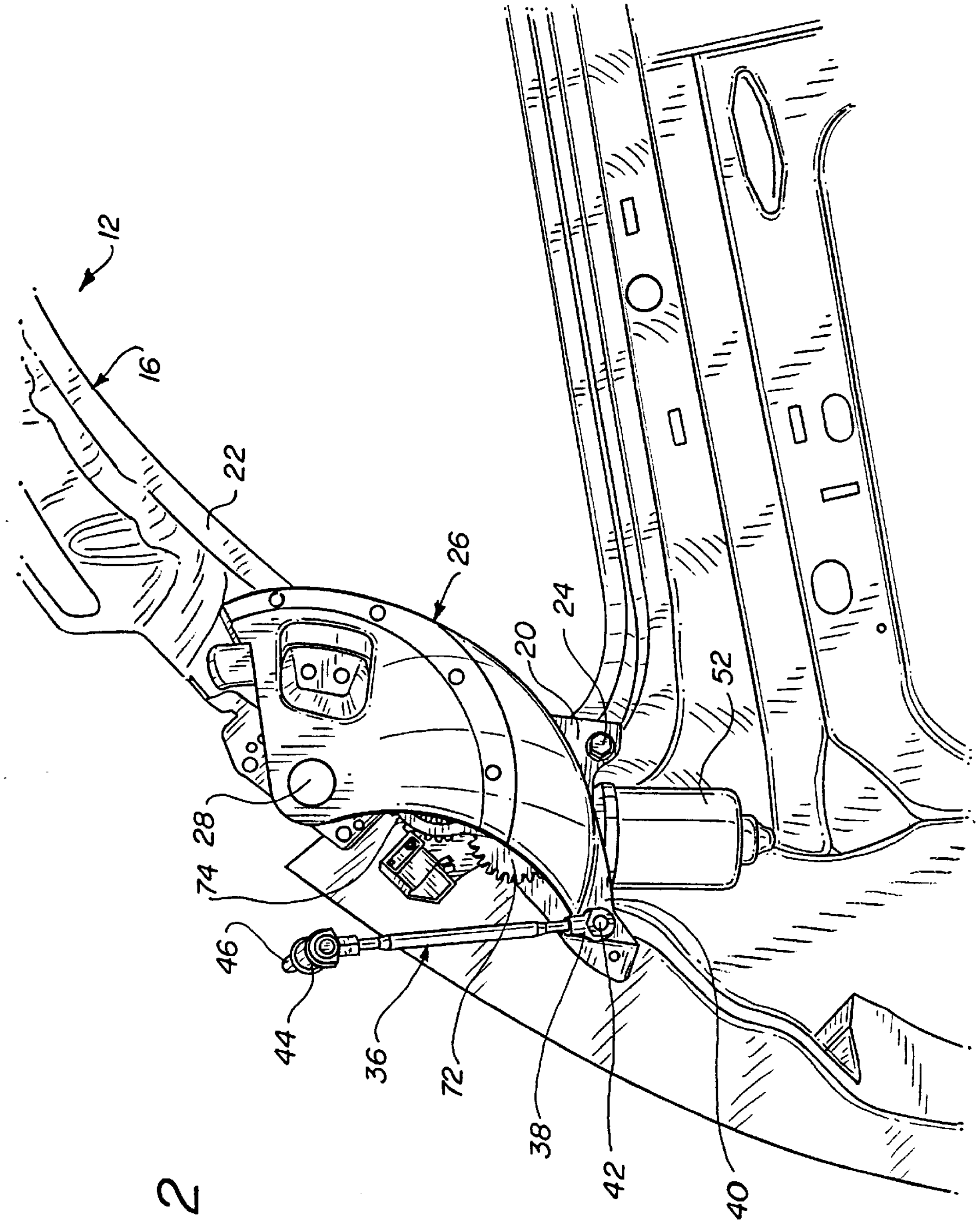
FIG. 2 is an enlarged side view of a portion of the vehicle of FIG. 1 further illustrating attachment of the drive arrangement of the present invention to the D-pillar of the exemplary motor vehicle, interior trim portions normally attached to the body have been removed.

The crank arm 26 is interconnected to the closure panel or liftgate 14 through a linkage 36. The linkage 36 includes a first end or lower end 38 which is pivotally interconnected to a lower portion 40 of the crank arm 26 through a pivot pin 42. A second end 44 or upper end of the linkage 36 is attached to the liftgate 14. In the embodiment illustrated, the second end 44 is attached to the liftgate 14 through a mounting element 46. The mounting element 46 is fixedly attached to the liftgate 14 and is preferably shown to include a spherical end 48 (partially shown in FIG. 4) which is received by the second end 44 of the linkage 36 to permit universal movement therebetween. In FIGS. 3A–3C and 4, the crank arm 26 has been removed for illustration. It will be understood that the lower end 38 of the linkage 36 is positioned in FIGS. 3A, 3B and 4 as it would be normally attached to the crank arm 26 as shown in FIG. 2.

The drive arrangement 10 of the present invention is further shown to include a set of gears 50 which are driven by a motor assembly 52. In the exemplary embodiment, the motor assembly 52 includes a reversible electric motor powered by the motor vehicle electrical system in a conventional manner. The set of gears 50 includes a first gear or driven gear 58 ultimately driven by the motor assembly 52. The driven gear 58 is mounted for rotation with a pinion shaft 60 which is rotatably carried by the mounting member 20 in a conventional manner. The set of gears 50 further includes a second gear or drive gear 54 mounted for rotation on an output shaft 56 of the motor assembly 52. The drive gear 54 and driven gear 58 are meshingly interconnected in a manner to be discussed below.

The crank arm 26 is illustrated to further include a rack-type gear or sector gear 62. The sector gear 62 is constructed of metal and bolted, welded or otherwise suitably attached to an outboard facing side 64 of the crank arm 26. Alternatively, it will be understood that the sector gear 62 may be unitarily formed with the crank arm 26. In the exemplary embodiment, the sector gear 62 has a plurality of teeth 66 formed on a concavely curved surface 68 thereof. As shown most clearly in FIGS. 3A through 3C, the sector gear 62 is in constant mesh with the driven gear 58 of the set of gears 50. A sector gear cover 69 is preferably attached to the sector gear 62 and radially extends inward relative to the teeth 68 of the sector gear 62 to protect the teeth 68 in an axial direction.

Figure 3B:
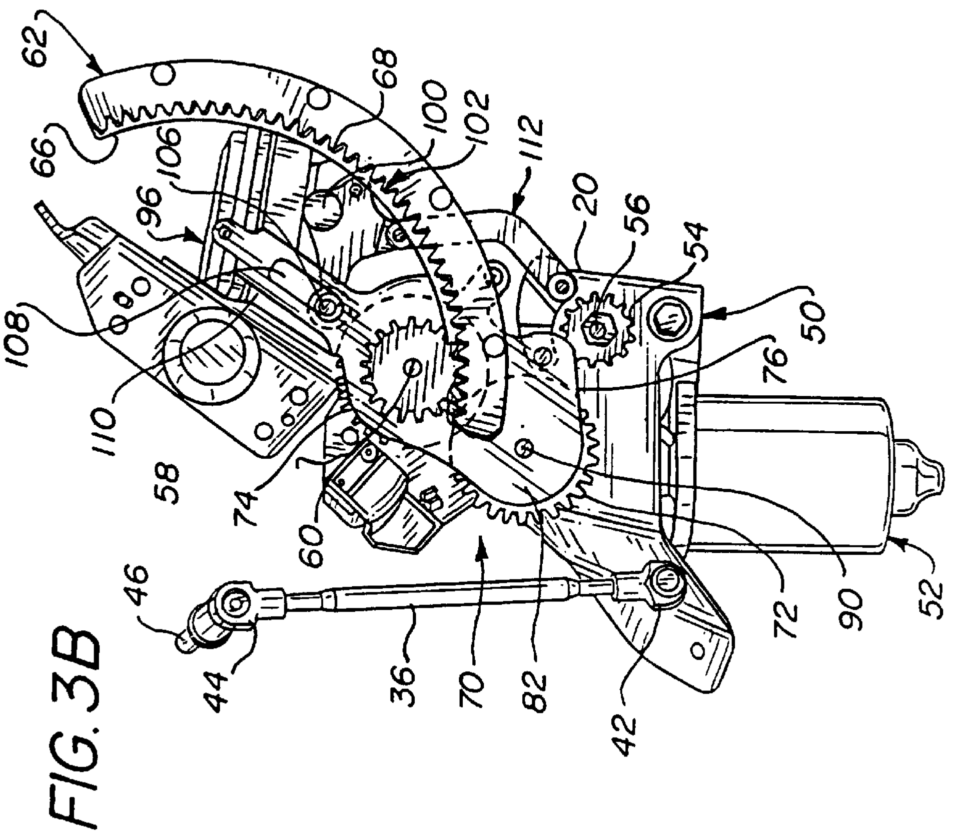
FIG. 3B is an enlarged side view of the drive arrangement of the present invention similar to FIG. 3A, illustrating the clutching mechanism in a disengaged position.
Figure 3A:
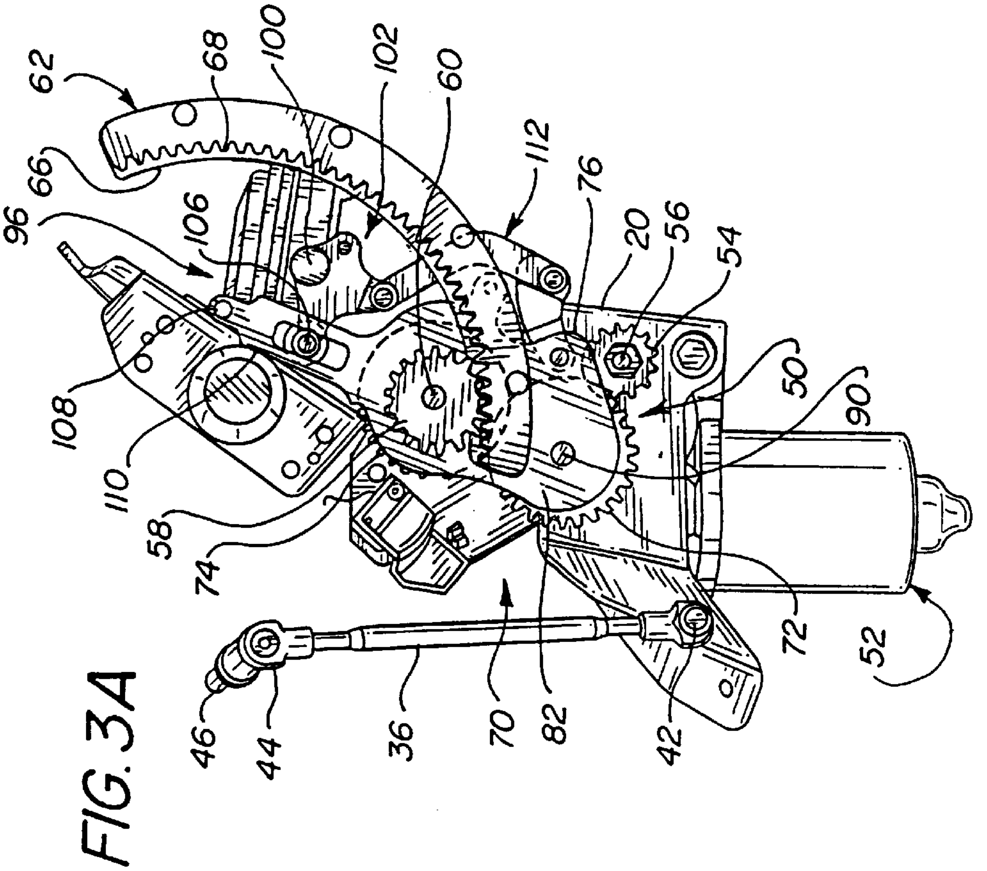
FIG. 3A is an enlarged side view of the drive arrangement of the present invention viewed in an outboard direction and shown with the crank arm removed for purposes of illustration, the clutching mechanism shown in an engaged position.
Figure 3C:
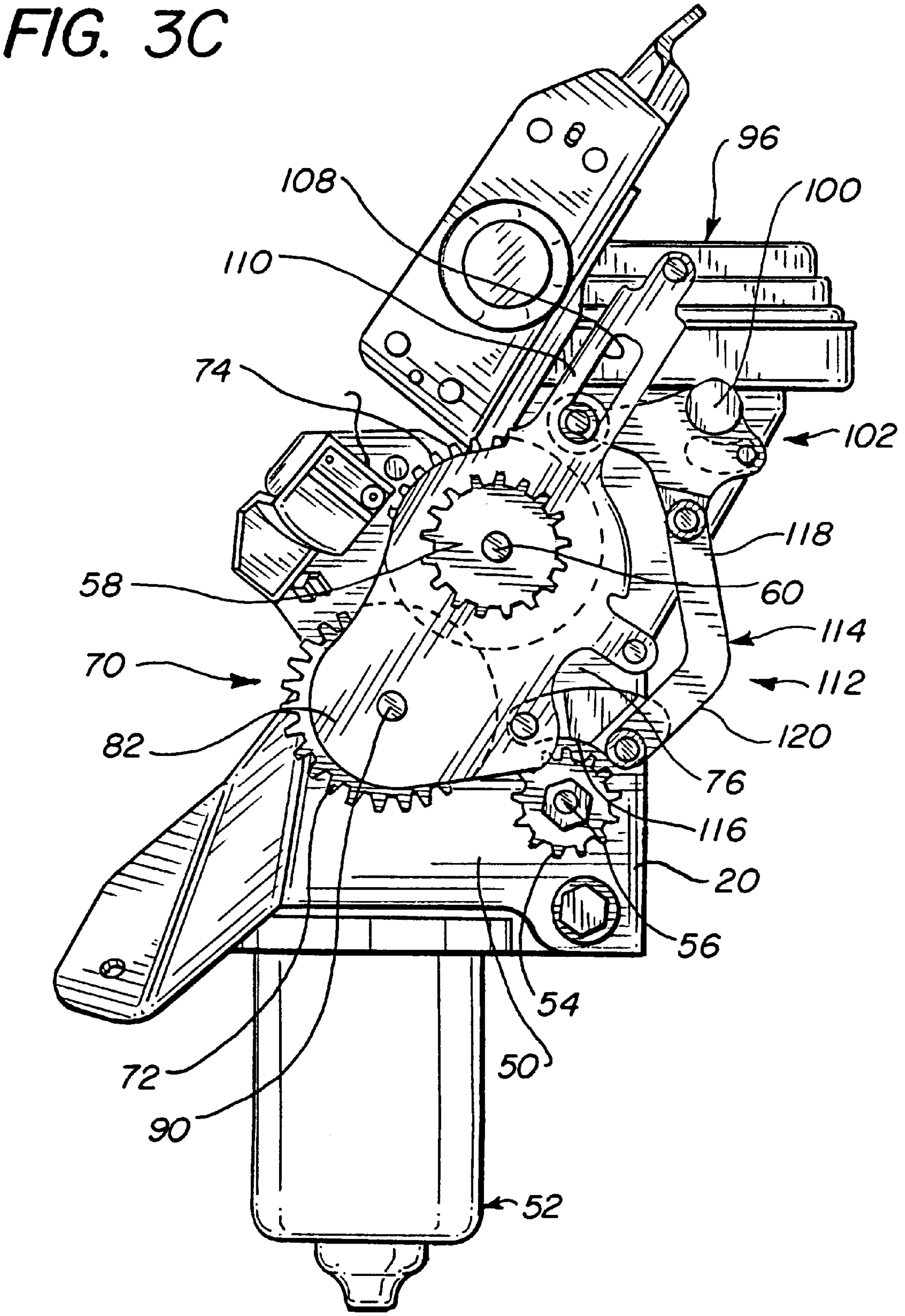
FIG. 3C is another enlarged side view of the drive arrangement of the present invention similar to FIG. 3A shown with the sector gear removed to further illustrate the clutching mechanism.
Figure 4:
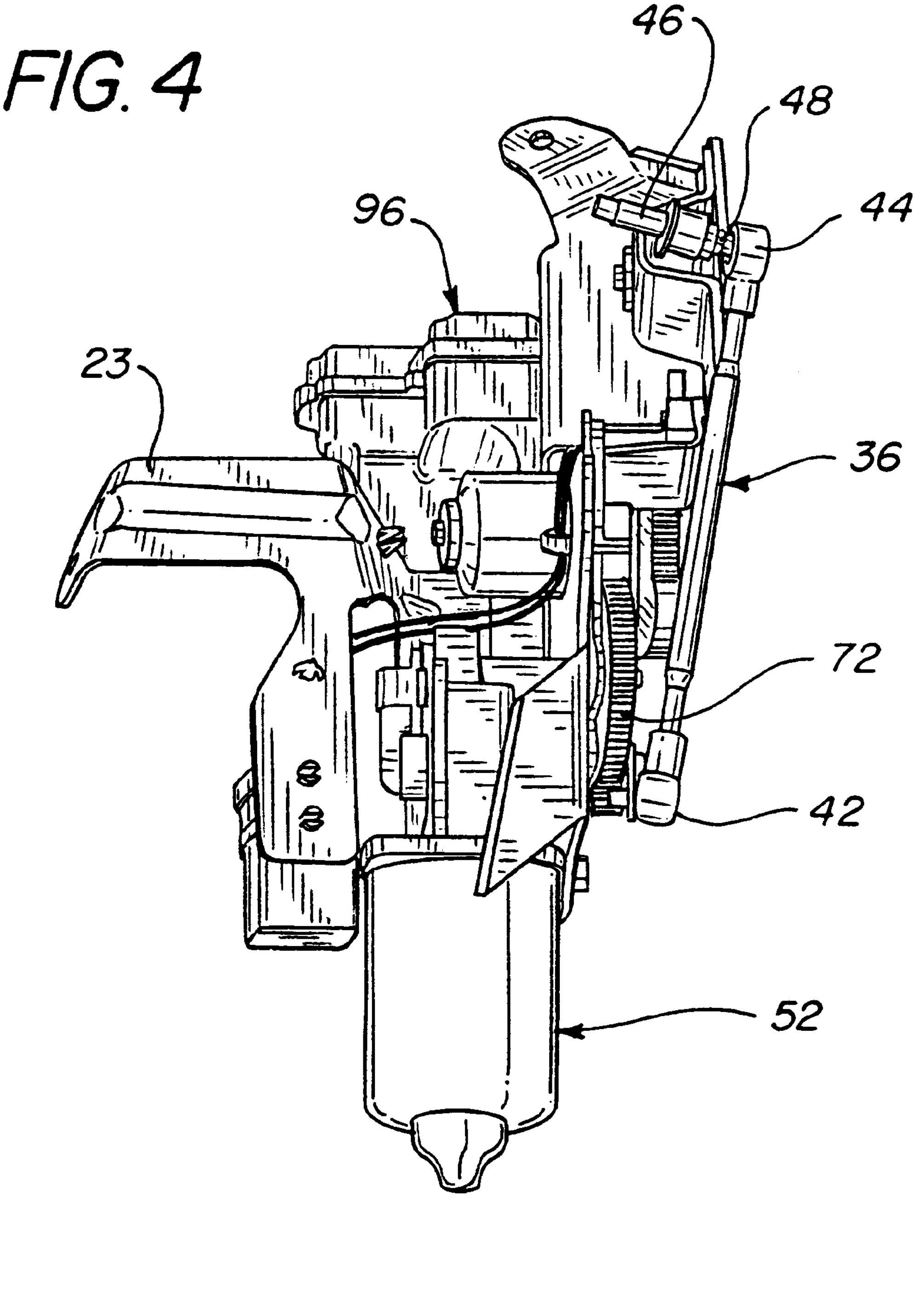
FIG. 4 is an enlarged rear view of the drive arrangement of the present invention, again shown with the crank arm removed.

To provide means for selectively engaging and disengaging the driven gear 58 from the motor assembly 52, the drive arrangement 10 of the present invention is constructed to include a clutching mechanism 70. The clutching mechanism 70 is illustrated in FIG. 3A in an engaged position. The disengaged position of the clutching mechanism 70 is shown in FIGS. 3B and 3C.

The clutching mechanism 70 incorporates the set of gears 50. In the exemplary arrangement illustrated, the driven gear 58 is an inboard pinion gear 58. The drive gear 54 is in meshing engagement with an idler gear 72, which is in turn in meshing engagement with an outboard pinion gear 74. As will be appreciated below, the meshing engagement between the idler gear 72 and the outboard pinion gear 74 is constant. The outboard pinion gear 74 is mounted to the pinion shaft 60 and thereby arranged for common rotation with the inboard pinion gear 58.

Figure 5:
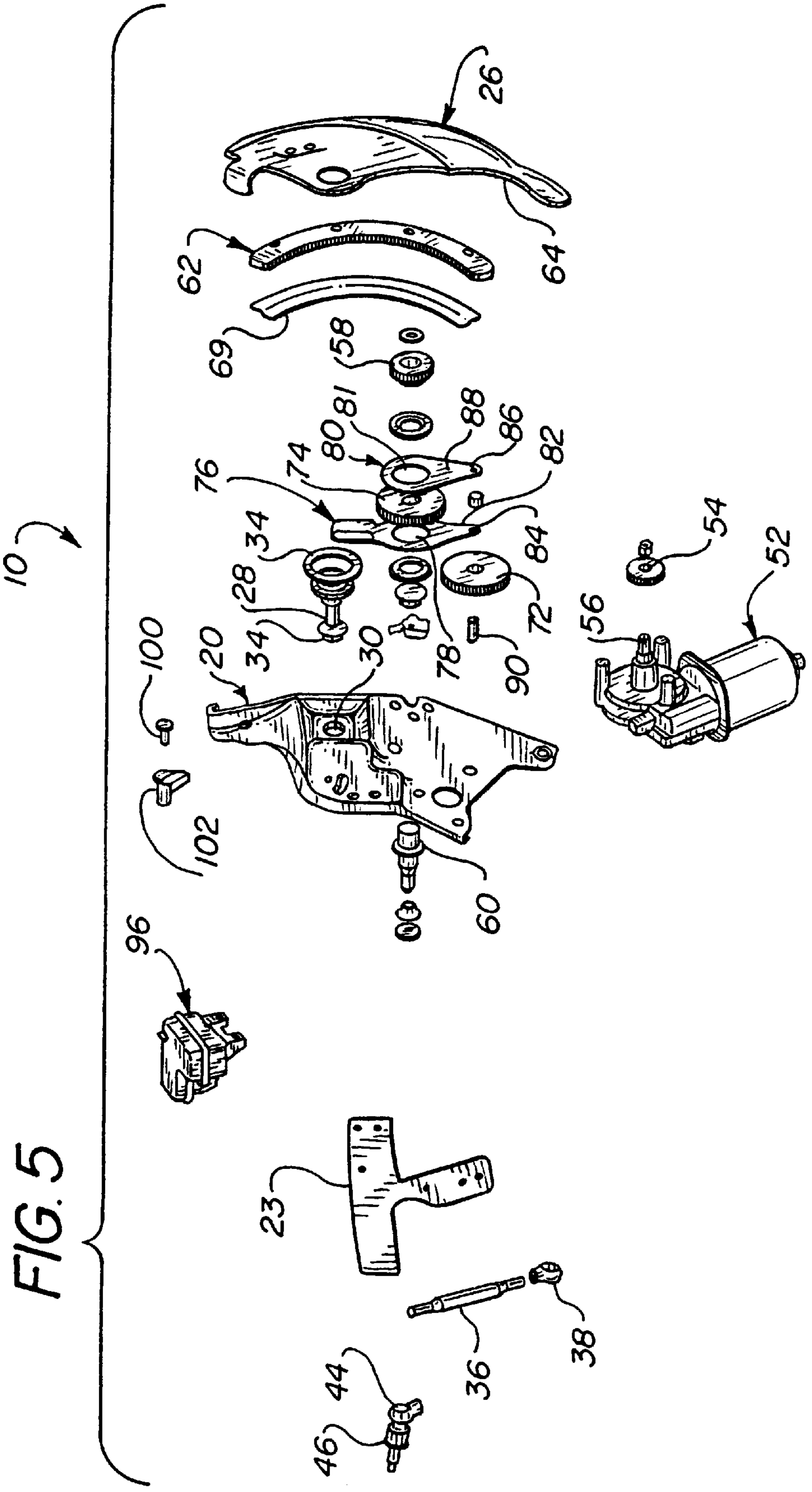
FIG. 5 is an exploded perspective view of the drive arrangement of the present invention.

The clutching mechanism 70 is illustrated to further include a pivot arm 76 which defines a central aperture 78 (shown in FIG. 5). The central aperture 78 is adapted to receive the pinion shaft 60 and permit rotation of the pivot arm 76 about the pivot axis defined by the pinion shaft 60. In the embodiment illustrated, the pivot arm 76 is located immediately outboard of the outboard pinion gear 74. The pivot arm 76 cooperates with a guide cover 80 for rotatably supporting the idler gear 72. In a manner similar to the pivot arm 76, the guide cover 80 includes an aperture 81 for rotatably receiving the pinion shaft 60. A first end 82 or lower end of the pivot arm 76 defines an aperture 84. A cooperating aperture 86 is provided in a lower end 88 of the guide cover 80. The idler gear 72 is carried on a pivot pin 90. The pivot pin 90 passes through the apertures 84 and 86 of the pivot arm 74 and guide cover 80, respectively. In a manner which will be addressed below, rotation of the pivot arm 76 and guide cover 80 about the pinion shaft 60 serves to move the idler gear 72 into and out of engagement with the drive gear 54.

The clutching mechanism 70 of the present invention is additionally shown to include an actuator 96 which is powered by the motor vehicle electrical system in a conventional manner. The actuator 96 is secured to the mounting member 20 with suitable fasteners. The actuator 96 is operative for rotating an output shaft 100 (shown in FIGS. 3A and 3B) extending therefrom. The output shaft 100 controls an actuator lever 102. An end 106 of the actuator lever 102 is retained within an elongated slot 108 defined in a second or upper end 110 of the pivot arm 76.

In the exemplary embodiment, the clutching mechanism 70 additionally incorporates a four-bar linkage arrangement 112 shown most clearly in FIG. 3C. The linkage arrangement 112 includes a first link 114 and a second link 116 which cooperate with the actuator lever 102 and pivot arm 76. The first link 114 has a first arm 118 and a second arm 120 disposed at an angle of approximately 135° to one another. A distal end of the first arm 118 is pivotally attached to the lever 102. A distal end of the second arm 120 is pivotally attached to a first end of the second link 116. A second end of the second link 116 is pivotally attached to a lower portion of the pivot arm 76. The linkage arrangement 112 assists in moving the idler gear 72 into and out of engagement with the drive gear 54 in response to rotation of the actuator lever 102.

When the clutching mechanism 70 is in its engaged position (as shown in FIG. 3A), the end 106 of the actuator lever 102 is in the distal portion of the elongated slot 108 provided in the pivot arm 76. Through counterclockwise rotation of the output shaft 100, the actuator 96 causes corresponding counterclockwise rotation of the actuator lever 102. As a result, the end 106 translates downwardly along the elongated slot 108 of the pivot arm 76, causing the pivot arm 76 to rotate in a clockwise direction. This clockwise rotation of the pivot arm 76 displaces the idler gear 72 from its meshing engagement with the drive gear 54 to the clutching mechanism release position of FIGS. 3B and 3C.

The clutching mechanism 70 is normally in its disengaged position. As such, the liftgate 14 can be manually articulated between its open and closed positions without any added effort. Manual articulation of the liftgate may be desired in the event of electrical system failure or otherwise. By maintaining the clutching mechanism normally in the disengaged position, manual articulation of the liftgate 14 does not drive the gears 50 and drive motor assembly 52 in a reverse direction.

To articulate to the minivan liftgate 14 from the closed position to the open position, the actuator 96 rotates the actuator lever 102 clockwise so as to upwardly translate the end 106 of the lever 102 in the slot 108 (e.g., from the position shown in FIGS. 3B and 3C to the position shown in FIG. 3A). In a reverse manner from that discussed above, the idler gear 72 is moved into mesing engagement with the drive gear 54. That is, counterclockwise rotation of the pivot arm 76 results in pivoting thereof about the pinion shaft 60 which serves to engage the idler gear 72 with the output gear 54 of the motor assembly 52. In the clutch engaged position, the idler gear 72 is in meshing engagement with the output gear 54 of the motor assembly 52. The drive gear 54 for the motor assembly 52 is then actuated to rotate the output gear 54 clockwise. Resulting counterclockwise rotation of the idler gear 72, which is in constant meshing engagement with the outboard pinion gear 74, rotates the outboard and inboard pinion gears 74 and 58 clockwise. Constant meshing engagement between the inboard pinion gear 58 and the sector gear 52 rotates the crank arm 26 clockwise (see FIG. 2) to articulate the liftgate 14 to its open position.

In the exemplary embodiment, the motor assembly 52 and the actuator 96 are controlled by a single switch (not shown) located within the passenger compartment of the motor vehicle 12. Additionally, the motor assembly 52 and the actuator 96 may be controlled remotely. Either manner of operation will be understood to be conventional in nature and need not be further described herein.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A drive arrangement for articulating a liftgate of a motor vehicle between an open position and a closed position, the liftgate mounted to a body of the motor vehicle for articulation about a pivot axis, the drive arrangement comprising:

a mounting member for attachment to the body of the motor vehicle;

a drive motor attached to said mounting member;

a first gear driven by said drive motor;

a crank arm pivotally interconnected to said mounting member, said crank arm including a second gear; and a linkage including a first end attached to said crank arm and a second end for attachment to said liftgate; and a clutching mechanism operative for selectively coupling and decoupling said second gear to said first gear, said clutching mechanism including a first pinion gear in constant meshing engagement with said second gear.

2. The drive arrangement for articulating a liftgate of a motor vehicle of claim 1, wherein said second gear is a sector gear.

3. The drive arrangement for articulating a liftgate of a motor vehicle of claim 2, wherein said sector gear includes an inner radius and a plurality of teeth formed on a concavely curved surface thereof.

4. The drive arrangement for articulating a liftgate of a motor vehicle of claim 1, wherein said clutching mechanism further includes a second pinion gear, the first and second pinion gears mounted for common rotation on a pinion shaft extending from said mounting member and an idler gear in constant meshing engagement with said second pinion gear, said first pinion gear being in constant meshing engagement with said second gear, said clutching mechanism operative to selectively move said idler gear into and out of meshing engagement with said first gear.

5. The drive arrangement for articulating a liftgate of a motor vehicle of claim 4, wherein said clutching mechanism further includes a pivot arm mounted for rotation about said pinion shaft, said idler gear mounted for rotation on said pivot arm.

6. The drive arrangement for articulating a liftgate of a motor vehicle of claim 5, wherein said clutching mechanism further includes an actuator having a rotatable actuator lever, and further wherein said pivot arm defines an elongated slot receiving a portion of said actuator lever, said actuator lever being rotatable in a first direction for rotating said pivot arm to disengage said idler gear and said first gear.

7. A motor vehicle comprising:

a body;

a closure panel mounted to said body for articulation about a pivot axis between an open position and a closed position; and a drive arrangement for articulating said closure panel between said open position and said closed position under a source of power, said drive arrangement including:

a mounting member interconnected to said body of the motor vehicle;

a drive motor attached to said mounting member;

a first gear driven by said drive motor;

a crank arm pivotally interconnected to said mounting member, said crank arm including a driven gear; and a linkage including a first end attached to said crank arm and a second end attached to said closure panel; and a clutching mechanism operative for selectively coupling and decoupling said second gear to said first gear, said clutching mechanism including a first pinion gear in constant meshing engagement with said second gear.

8. The motor vehicle of claim 7, wherein said second gear is a sector gear.

9. The motor vehicle of claim 8, wherein said sector gear includes a plurality of teeth formed on a concavely curved surface thereof.

10. The motor vehicle of claim 7, wherein said clutching mechanism further includes a second pinion gear, the first and second pinion gears mounted for common rotation on a pinion shaft extending from said mounting member and an idler gear in constant meshing engagement with said second pinion gear, said first pinion gear being in constant meshing engagement with said second gear, said clutching mechanism operative to selectively move said idler gear into and out of meshing engagement with said first gear.

11. The motor vehicle of claim 10, wherein said clutching mechanism further includes a pivot arm mounted for rotation about said pinion shaft, said idler gear mounted for rotation on said pivot arm.

12. The motor vehicle of claim 11, wherein said clutching mechanism further includes an actuator having a rotatable actuator lever, and further wherein said pivot arm defines an elongated slot receiving a portion of said actuator lever, said actuator lever being rotatable in a first direction for rotating said pivot arm to disengage said idler gear and said first gear.

13. A motor vehicle comprising:

a body defining a rear opening;

a liftgate mounted to said body for articulation about a horizontally extending pivot axis between an open position and a closed position for selectively providing access to said rear opening;

a drive arrangement for articulating said closure panel between said open position and said closed position under a source of power, said drive arrangement including:

a mounting member interconnected to said body of the motor vehicle;

a drive motor attached to said mounting member;

a drive gear driven by said drive motor;

a crank arm pivotally interconnected to said mounting member, said crank arm including a sector gear; and a linkage including a first end attached to said crank arm and a second end attached to said liftgate; and a clutching mechanism operative for selectively coupling and decoupling said sector gear to said drive gear, said clutching mechanism including a first pinion gear in constant meshing engagement with said second gear.

14. The motor vehicle of claim 13, wherein said sector gear includes a plurality of teeth formed on a concavely curved surface thereof.

15. The motor vehicle of claim 13 wherein said clutching mechanism further includes a second pinion gear, the first and second pinion gears mounted for common rotation on a pinion shaft extending from said mounting member and an idler gear in constant meshing engagement with said second pinion gear, said first pinion gear being in constant meshing engagement with said second gear, said clutching mechanism operative to selectively move said idler gear into and out of meshing engagement with said first gear.

16. The motor vehicle of claim 15, wherein said clutching mechanism further includes a pivot arm mounted for rotation about said pinion shaft, said idler gear mounted for rotation on said pivot arm.

17. The motor vehicle of claim 16, wherein said clutching mechanism further includes an actuator having a rotatable actuator lever, and further wherein said pivot arm defines an elongated slot receiving a portion of said actuator lever, said actuator lever being rotatable in a first direction to disengage said idler gear and said drive gear.

* * * * *